(12) United States Patent
Zhong

(10) Patent No.: US 12,412,043 B2
(45) Date of Patent: Sep. 9, 2025

(54) RULE-BASED TECHNIQUES FOR EXTRACTION OF QUESTION AND ANSWER PAIRS FROM DATA

(71) Applicant: Oracle International Corporation, Redwood Shores, CA (US)

(72) Inventor: Xu Zhong, Melbourne (AU)

(73) Assignee: Oracle International Corporation, Redwood Shores, CA (US)

( * ) Notice: Subject to any disclaimer, the term of this patent is extended or adjusted under 35 U.S.C. 154(b) by 218 days.

(21) Appl. No.: 17/819,440

(22) Filed: Aug. 12, 2022

(65) Prior Publication Data

US 2023/0134149 A1 May 4, 2023

Related U.S. Application Data

(60) Provisional application No. 63/273,759, filed on Oct. 29, 2021.

(51) Int. Cl.
*G06F 40/35* (2020.01)
*G06F 40/137* (2020.01)
(Continued)

(52) U.S. Cl.
CPC ............ *G06F 40/35* (2020.01); *G06F 40/137* (2020.01); *G06F 40/221* (2020.01); *G06F 40/289* (2020.01); *G06N 20/00* (2019.01)

(58) Field of Classification Search
CPC ...... G06F 40/35; G06F 40/137; G06F 40/221; G06F 40/289; G06F 40/143; G06N 20/00; G06N 3/084; G06N 3/09; G06N 5/04
See application file for complete search history.

(56) References Cited

U.S. PATENT DOCUMENTS 11,544,478 B2 *  1/2023  Contractor ............... G06N 5/04
2001/0011286 A1    8/2001  Inoue et al.
(Continued)

FOREIGN PATENT DOCUMENTS

WO   WO-2004068320 A2 *  8/2004  ....... G06F 17/30905

OTHER PUBLICATIONS

International Application No. PCT/US2022/074978, International Search Report and Written Opinion mailed on Dec. 7, 2022, 10 pages.
(Continued)

*Primary Examiner* — Richemond Dorvil
*Assistant Examiner* — Zeeshan Mahmood Shaikh
(74) *Attorney, Agent, or Firm* — Kilpatrick Townsend & Stockton LLP

(57) ABSTRACT

Techniques are disclosed for rules-based techniques for extraction of question-and-answer pairs from digital documents. In an exemplary technique, a digital text document can be accessed by executing a document indicator. A document hierarchy can be generated. The document hierarchy can include at least one parent node and child nodes corresponding to the parent node. Each node of the child nodes can correspond to a text feature of the digital text document. At least a first child node of the child nodes can be determined that corresponds to a first text feature. The parent node of the first child node and a second child node of the parent node can be determined. The second child node can correspond to a second text feature related to the first text feature. A training data set can be generated.

17 Claims, 11 Drawing Sheets

(51) Int. Cl.
  *G06F 40/221* (2020.01)
  *G06F 40/289* (2020.01)
  *G06N 20/00* (2019.01)

(56) References Cited

U.S. PATENT DOCUMENTS

| | | | |
|---|---|---|---|
| 2004/0254917 A1* | 12/2004 | Brill | G06F 16/3329 |
| 2015/0006528 A1* | 1/2015 | Rao | G06F 16/35 707/730 |
| 2018/0131645 A1* | 5/2018 | Magliozzi | G06F 40/30 |
| 2019/0043106 A1* | 2/2019 | Talmor | G06N 20/00 |
| 2020/0285952 A1 | 9/2020 | Liu et al. | |
| 2020/0341755 A1* | 10/2020 | Woulfe | G06Q 10/063112 |
| 2021/0311728 A1* | 10/2021 | Raiskin | G06F 40/143 |
| 2022/0382988 A1* | 12/2022 | Frost | G06N 5/041 |

OTHER PUBLICATIONS

Indian Application No. IN202447028571, "First Examination Report", mailed Jul. 9, 2025, 6 pages.

\* cited by examiner

RULE-BASED TECHNIQUES FOR EXTRACTION OF QUESTION AND ANSWER PAIRS FROM DATA

CROSS REFERENCE TO RELATED APPLICATIONS

This application claims the benefit of and priority to U.S. Provisional Application No. 63/273,759, filed on Oct. 29, 2021, which is incorporated herein by reference in its entirety for all purposes.

FIELD

The present disclosure relates generally to chatbot systems, and more particularly, to rule-based techniques for extraction of question and answer pairs from data.

BACKGROUND

Instant messaging functionality and automated chat platforms are efficient solutions to modern customer service issues. Organizations can leverage these practices to provide timely and responsive service to their customers without committing valuable human capital to individual user inquiries. Modern automated chat platforms may utilize a "chatbot" to handle customer service requests or other interactions with humans. Some chatbots may be designed and trained to handle specific requests, such as answering inquiries posed by a human.

Training a chatbot to interact effectively with a human is a time and resource intensive task. A large volume of training data is often required during the training process, and the chatbot model being trained may be designated for a certain task for which an existing set of training data is not appropriate. Obtaining sufficient training data to train these chatbots often requires a user to manually create training data or parse a document to extract and label data in a manner that a chatbot model can interact with. This is a very time and resource intensive task for the human and delays the deployment of the chatbot. For example, to train a chatbot to answer questions posed by a human, the chatbot may be required to parse thousands of examples of sample questions and corresponding answers, that must be written or modified manually by a human.

A great number of documents are available digitally that include questions and answers. For example, a customer training a new chatbot may utilize existing documents on the customer's website, such as frequently asked questions (FAQ) to generate a set of training data. These existing documents are often in unstructured formats, such as portable document format files (PDF files) in which a chatbot cannot be trained, as the chatbot will not accept the file as a training input. Furthermore, a human user must personally parse the unstructured documents and manually modify or regenerate the data in an appropriate embedded format compatible the chatbot before training may commence.

BRIEF SUMMARY

Techniques are disclosed for rules-based techniques for extraction of embedded data from documents.

In various embodiments, a method includes accessing, by a data processing system, a digital text document by executing a document indicator; generating, by the data processing system and based on the digital text document, a document hierarchy comprising at least one parent node and a plurality of child nodes corresponding to the at least one parent node, each node of the plurality of child nodes corresponding to a text feature of the digital text document; determining, by the data processing system and based on the document hierarchy, at least a first child node of the plurality of child nodes corresponding to a first text feature; determining, by the data processing system and based on the first child node, the parent node of the first child node and a second child node of the parent node, the second child node corresponding to a second text feature related to the first text feature; and generating, by the data processing system, a training data set, the training data set comprising a mapping between the first text feature and the second text feature and configured to be input to a machine learning model to train one or more relationships in the machine learning model between the first text feature and the second text feature.

In various embodiments, a system can extract embedded data from documents. The system can include one or more processors and a non-transitory computer-readable medium coupled to the one or more processors. The non-transitory computer-readable medium can store instructions executable by the one or more processors to cause the one or more processors to perform various operations. The system can access a digital text document by executing a document indicator. The system can generate, based on the digital text document, a document hierarchy that includes at least one parent node and child nodes corresponding to the at least one parent node. Each node of the child nodes can correspond to a text feature of the digital text document. The system can determine, based on the document hierarchy, at least a first child node of the child nodes corresponding to a first text feature. The system can determine, based on the first child node, the parent node of the first child node and a second child node of the parent node. The second child node can correspond to a second text feature related to the first text feature. The system can generate a training data set. The training data set can include a mapping between the first text feature and the second text feature and can be configured to be input to a machine learning model to train one or more relationships in the machine learning model between the first text feature and the second text feature.

In various embodiments, a non-transitory computer-readable medium storing instructions executable by one or more processors for causing the one or more processors to perform various operations for extracting embedded data from documents. The operations can involve accessing a digital text document by executing a document indicator. The operations can involve generating, based on the digital text document, a document hierarchy comprising at least one parent node and child nodes corresponding to the at least one parent node. Each node of the child nodes can correspond to a text feature of the digital text document. The operations can involve determining, based on the document hierarchy, at least a first child node of the child nodes corresponding to a first text feature. The operations can involve determining, based on the first child node, the parent node of the first child node and a second child node of the parent node, the second child node corresponding to a second text feature related to the first text feature. The operations can involve generating a training data set. The training data set can include a mapping between the first text feature and the second text feature and can be configured to be input to a machine learning model to train one or more relationships in the machine learning model between the first text feature and the second text feature.

In some embodiments, the document indicator is a uniform resource location (URL) address. In some further embodiments, executing the document indicator comprises executing the URL address to access the digital text document in a network domain.

In some embodiments, the digital text document is a web-based document comprising one or more HyperText Markup Language (HTML) expressions, the one or more HTML expressions structured in the digital text document according to the document hierarchy. In some further embodiments, the method further comprises extracting, in response to accessing the digital text document, the one or more HTML expressions and modifying the one or more HTML expressions to generate compressed HTML data, the compressed HTML data corresponding to a subset of the HTML data not comprising auxiliary text characters, wherein the document hierarchy is generated based on the compressed HTML data.

In some embodiments, the document hierarchy is a tree diagram, the at least one parent node is a branch node of the tree diagram, and the plurality of child nodes are leaf nodes of the branch node. In some embodiments, the first child node of the plurality of child nodes comprises evaluating one or more nodes of the document hierarchy using a feature list, the feature list comprising one or more expressions relating to the first text feature. In some embodiments, determining the parent node and the second child node comprises evaluating one or more nodes of the document hierarchy using a feature list, the feature list comprising one or more expressions relating to the parent node and the second text feature. In some embodiments, determining the first child node, the parent node and the second child node comprises traversing the nodes of the document hierarchy using a depth-first-search.

In some embodiments, the methods or operations further comprise training the machine learning model by inputting the training data set to the machine learning model to generate an objective value, wherein training the one or more relationships in the machine learning model comprises modifying one or more weight values of the machine learning model based on the generated objective value.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
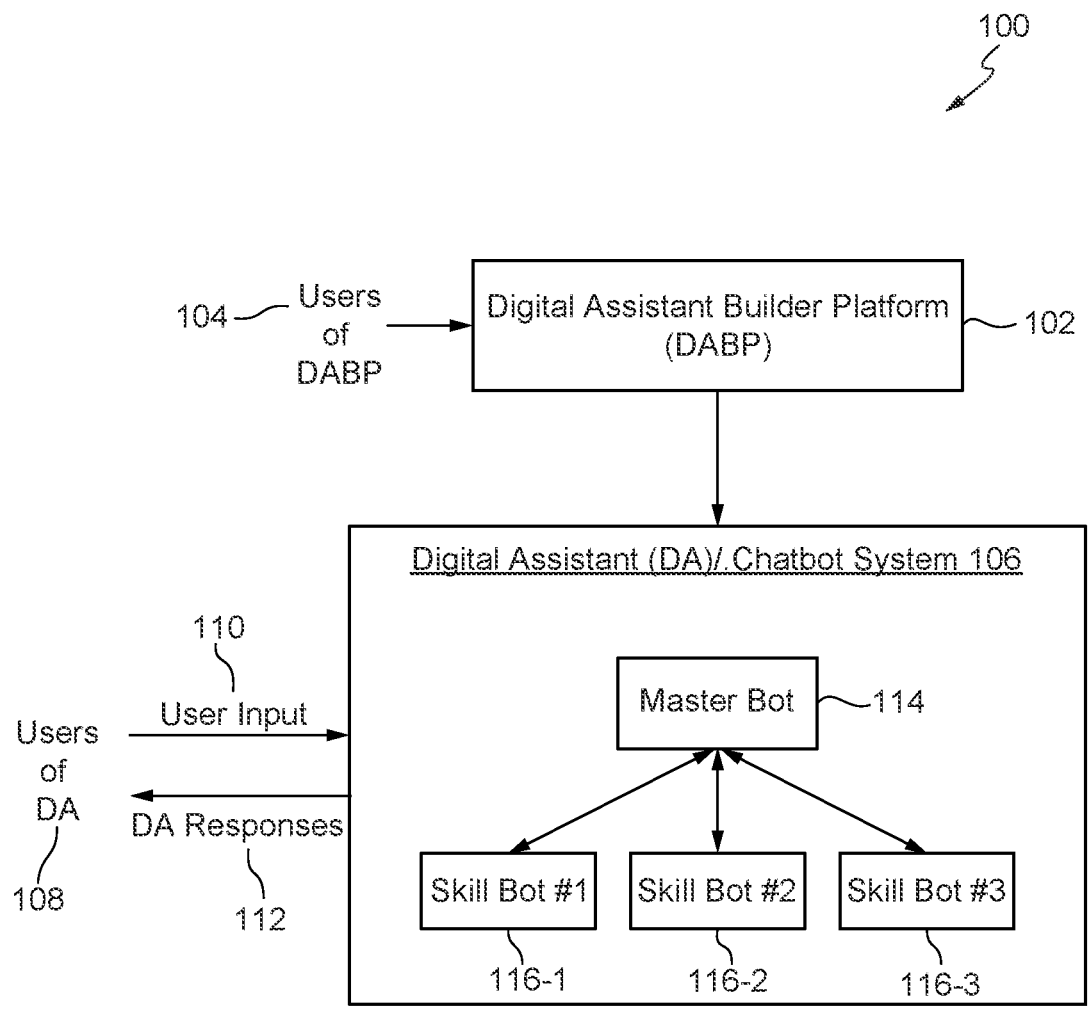
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Training a chatbot to interact effectively with a human is a time and resource intensive task. An untrained chatbot will not be able to process new or complex data properly and may return no answer or an incorrect answer in response to various utterances such as questions posed to a chatbot. A large volume of data is often required to train a chatbot model to a point that it can effectively answer human utterances most of the time. This data includes labelled training data where a chatbot model, such as a neural network, may be trained by generating predicted data for an utterance and then comparing the predicted data to ground-truth data. The difference between the predicted data and the ground-truth data can be measured using an objective function and used to refine the model (e.g., learn model parameters via back propagation).

The labelled training data is typically generated manually by reviewing documents with data sought to be included as training data. A human may personally parse the document for question-and-answer pairs that can be transformed into training data for a chatbot model. The human will copy the question and the answer for a question that the chatbot should "learn" and use the pair to generate a training dataset that will be used to train the chatbot. This requires that the human user manually review documents for question and answer pairs, often unaware of where they may be or missing them due to human error. This contributes to inefficient utilization of resources and a delay in training and deployment of chatbot models.

In order to overcome these challenges and others, described herein are rule based techniques for extraction of training data such as question-and-answer pairs from digital documents that may be used to train a chatbot model. The rule based techniques described herein allow for automatic and dynamic extraction of training data that may be used to train a machine learning model without requiring human action or intervention. Automated and dynamic extraction will allow a chatbot model to be trained more quickly, comprehensively, and thoroughly due to the elimination of human error and inefficiency in the training data generation processes. For example, rules-based techniques may not just extract question and answer pairs from digital documents faster and more accurately than humans, but may also allow for more efficient preprocessing of data prior to extraction and higher throughput of extraction compared to manually generating training data.

Example Chatbot System

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks.

A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and the their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section
(b) a default transitions section
(c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
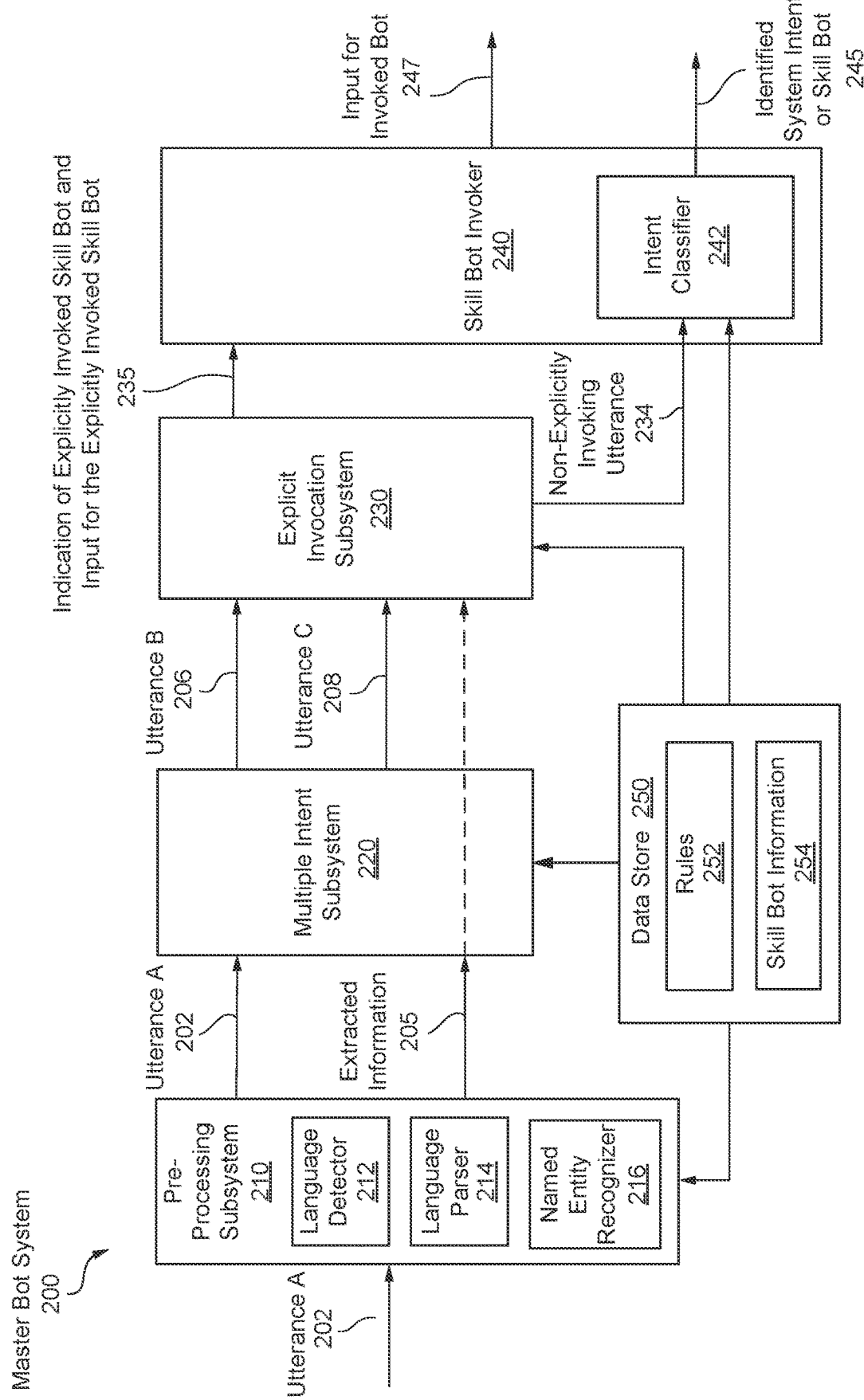
FIG. 2 is a simplified block diagram of a master bot (MB) system according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
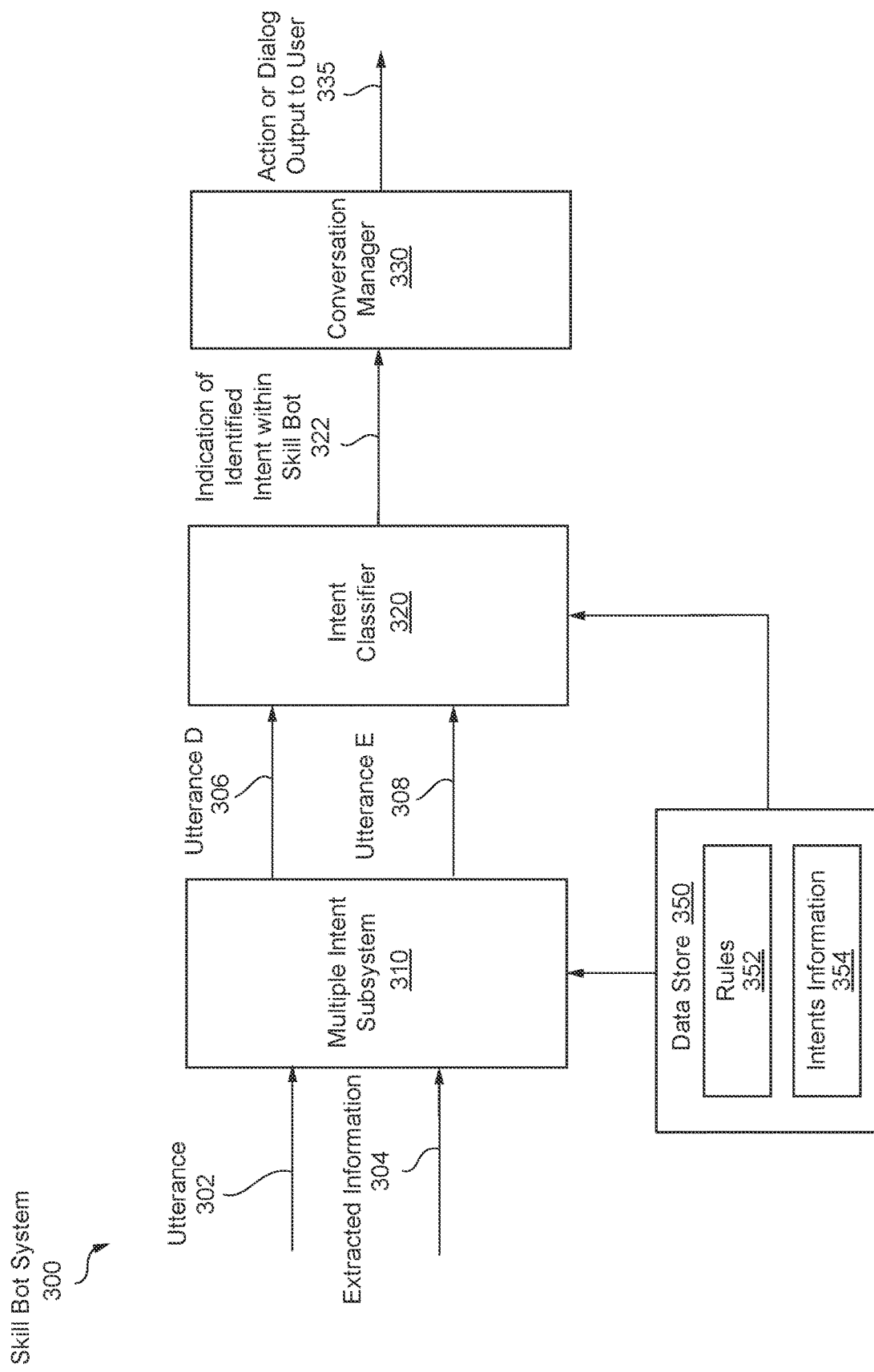
FIG. 3 is a simplified block diagram of a skill bot system according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Example Data Processing System

Figure 4:
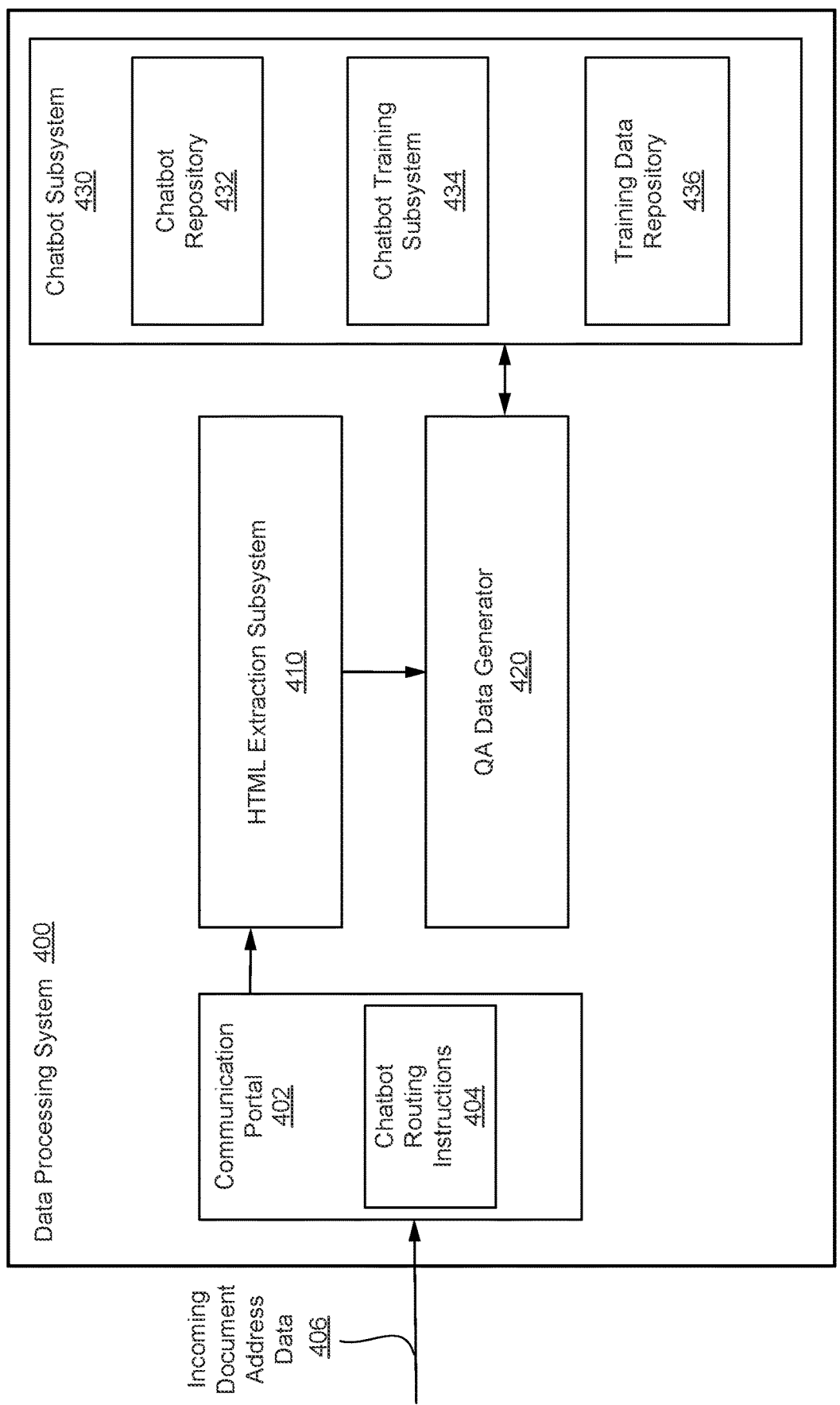
FIG. 4 is a simplified block diagram of a computing system implementing a data processing system for rules-based question-and-answer data extraction according to various embodiments.

FIG. 4 is a simplified block diagram of a computing system implementing a data processing system for rules-based question-and-answer data extraction according to various embodiments. The arrangement shown in FIG. 4 is an example embodiment of a data processing system which may be utilized to perform all or part of the methods described herein, though the system shown in FIG. 4 is not the only system that may perform those methods. Data processing system 400 depicted in FIG. 4 can be implemented in software only, hardware only, or a combination of hardware and software.

As depicted in FIG. 4, data processing system 400 may be a system for extracting data from digital documents for generating training data for chatbot applications. Data processing system 400 may include various components and subsystems for receiving document address data and generating training data for training chatbot-based machine learning models. For example, data processing system 400 may include a repository of deployable chatbot models that may be trained using data extracted from text-based documents. Subsystems of data processing system 400 may be configured to extract data from digital documents according to hierarchically-derived rules-based processing to generate training data from these digital documents. Subsequent to generating the training data, different subsystems of data processing system 400 may use the training data for training the chatbots to interact with humans.

As depicted in FIG. 4, data processing system 400 includes HTML extraction subsystem 410, question-and-answer (QA) data subsystem 420 and chatbot subsystem 430. HTML extraction subsystem 410 may be, for example, a subsystem of data processing system 400 configured to receive address data for a location of a digital document or a method of obtaining a digital document that is structured using the HTML programming language. For example, HTML extraction subsystem 410 may be configured to receive a uniform resource locator (URL) input and output structural data related to an HTML document. To perform this process, HTML extraction subsystem. It will be appreciated that HTML extraction subsystem 410 is used as an exemplary embodiment and that the structural data output may be related to different formats/languages, including but not limited to, eXtensible Markup Language (XML), JAVASCRIPT®, PYTHON®, etc.

The output structural data may be utilized by a QA data generator 420 to generate output QA data including mapped pairs of questions and answers in a natural language format extracted from the digital document. For example, QA data subsystem 420 may be engaged to generate output training data of question and answer pair that may be used to train chatbots within or utilizing chatbot subsystem 430. For example, a customer may send the document address data to data processing system 400 to cause the system to extract data from a corresponding digital document to train a chatbot on the data included in the digital document (e.g. a webpage). The use of rules-based hierarchical processing of digital document to generate this training data for training chatbots removes the need for costly and time inefficient manual generation of training data by humans.

In an example embodiment, a client of data processing system 400 utilizes a service including question-and-answer (QA) chatbot configured to receive questions from humans in the form of text and send a predicted answer back to the human. The client may utilize this service and the QA chatbot as part of its own service for its own customers. The client may send, or an operator of the chatbot may independently determine, for example, a URL address to data processing system 406 indicating a webpage including information which should be learned and utilized by a chatbot. Data processing system 400 may utilize rules-based extraction techniques to generate QA training data. The QA training data is used to train the QA chatbot, which may be stored in chatbot subsystem 430. As a result, the next time the QA chatbot is deployed, it is better configured to answer questions similar to those included in the digital document corresponding to the received URL. This process may occur automatically and independent of any manual intervention by a human.

Returning to FIG. 4, data processing system 400 may include communication portal 402. Communication portal 402 may be a subsystem of data processing system 400 configured to intake communications and data received from outside systems and perform the embodiments described herein. In various embodiments, communication portal 402 is configured to receive or otherwise access incoming document address data 406. For example, communication portal 402 may include chatbot routing instructions 404, which may be a set of instructions for determining how to route incoming document address data 406, including to HTML extraction subsystem 410. Document address data may include, for example, a URL address that may be executed on in a network access application, such as a browser or webcrawler, to access a digital document, such as a webpage. For example, in response to receiving incoming document address data 406, the communication portal 402 may determine that the data is a valid URL and may forward the URL to HTML extraction subsystem 410. In some embodiments, incoming document address data 406 may include an indication to utilize the address data included therein to train a particular chatbot model. Communication portal may determine that this request is valid, and forward the data to HTML extraction subsystem 410 to being the training data generation processes described herein.

HTML extraction subsystem 410 may include separate subsystems for executing the document address, accessing the digital document, and extracting/generating structural data such as HTML data. For example, HTML extraction subsystem 410 may include a first subsystem which is configured to execute the address data to access the digital document. The digital document data retrieved may be sent to or accessed by a second subsystem configured to process, parse, or otherwise manipulate the digital document to extract one or more underlying data structure or programmed resources inherent to the digital document. The data extracted by the second subsystem may be forwarded to a third subsystem configured to consolidate the data in a structured hierarchical format or representation to accurately reflect hierarchical elements within the digital document. This information may be forwarded to a training data generator, such as QA data generator 420. The process extracting structural data from a digital resource is further discussed below with reference to FIG. 4.

QA data generator 420 may include separate subsystems for generating training data, such as QA data for a chatbot, based on the received structural data from HTML extraction subsystem 410. For example, QA data generator 420 may include an first subsystem configured to process the HTML structure data from HTML extraction subsystem 410 to generate hierarchical tree data corresponding to a nodal hierarchy of text features extracted from the digital document. A second subsystem may parse the generated hierarchical tree data to determine a number of question text features and a number of corresponding answer text features represented by the nodal hierarchy. The parsing may be done according to a particular parsing scheme, such as depth-first search traversal of the tree data. It will be appreciated that the tree may be parsed/processing in any scheme known in the art and that depth-first search is considered here as a non-limiting example. A third subsystem may process the questions and answers determined by parsing the hierarchical tree data to generate one or more QA pairings. The QA pairings may be associated with mapping data and encoded in a format that may be input to a machine learning model. The QA data generation process is discussed further below with reference to FIG. 4.

Chatbot subsystem 430 may be a subsystem of data processing system 400 configured to perform processing or storage functions related to the chatbots. For example chatbot subsystem 430 may include chatbot repository 432, which may be a repository of chatbot models that may be trained and deployed for use by a service or a client. Chatbot training subsystem 434 may be a subsystem of chatbot subsystem 430 configured to utilize training data to train machine learning models of chatbots. For example, chatbot training subsystem 434 may receive training data generated by QA data generator 420 to cause training of a chatbot model stored in chatbot repository 432. Training data repository 436 may be a repository for storing training data generated by the QA data generator 420 for later training chatbot models. For example, training datasets associated with clients utilizing chatbots may be stored in training data repository so that training data is not required to be regenerated with for each new chatbot generated for a particular client.

EXAMPLE RULES-BASED EXTRACTION EMBODIMENTS

Figure 5A:
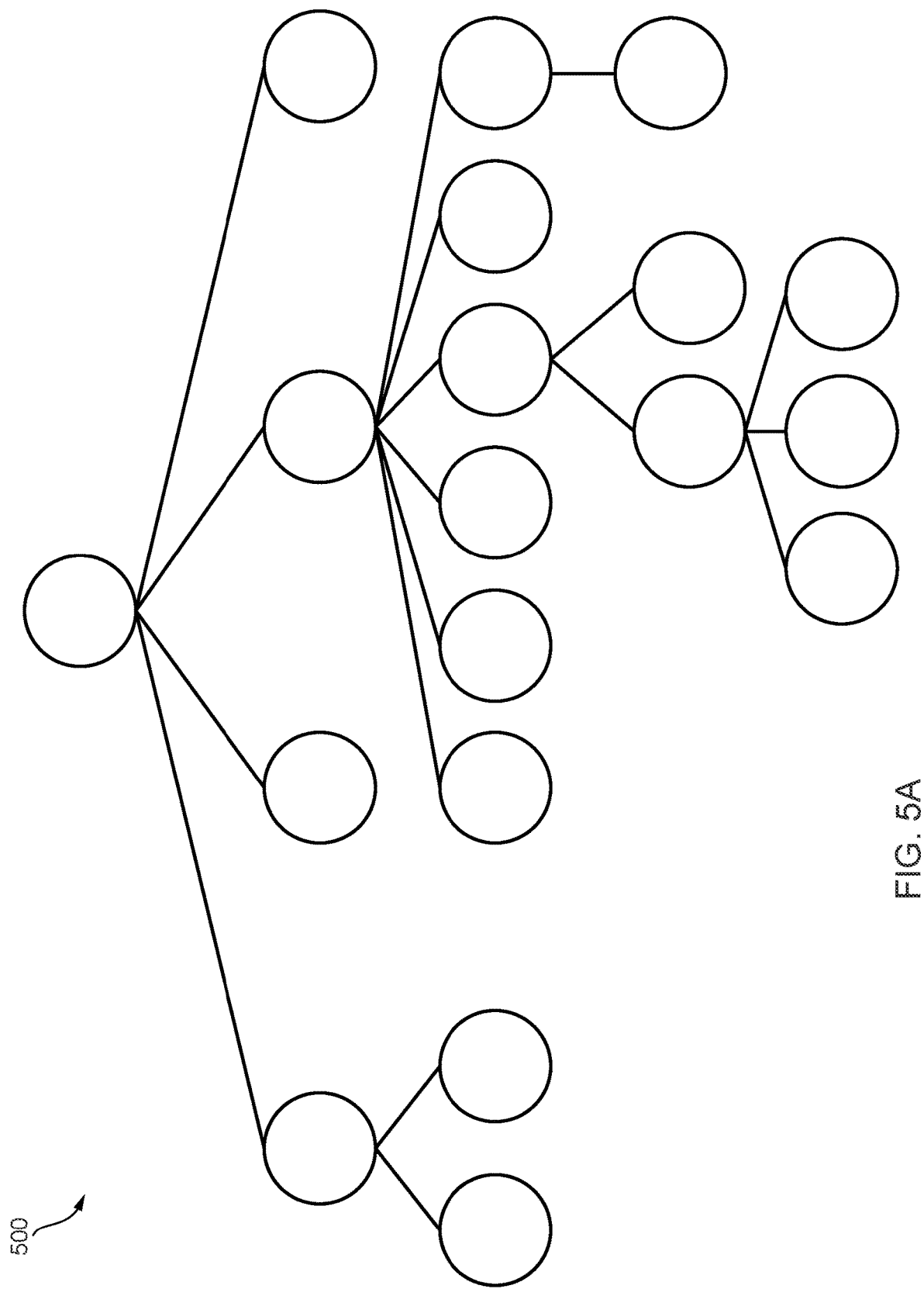
FIG. 5A illustrates an example document structure including a tree-based node hierarchy according to various embodiments.

FIG. 5A illustrates an example document structure including a tree-based node hierarchy according to various embodiments. FIG. 5A depicts an example hierarchical structure 500 as a tree-based hierarchy of nodes generated for a digital document. For example, hierarchical structure 500 may represent HTML elements of a digital document, such as a webpage. Each node of the hierarchy of nodes may represent an extracted or determined text feature of the digital document. For example, the nodes of the hierarchy may represent HTML tags in an underlying HTML code for a webpage. Each node may then have a value, such as the header tag and property attributes (e.g., class, font properties, hyperlinks, etc.) for the node and/or a set of text represented in the digital document.

As depicted in FIG. 5A, hierarchical structure 500 comprises a root node and a plurality of branch nodes. Each of the branch nodes includes a number of leaf nodes, so on. Hierarchical structure 500 is not a limiting example of a nodal hierarchy for implementing the embodiments described herein, and one having ordinary skill in the art will appreciate that the structures described herein may correspond to many kinds of hierarchy representations in a variety of graph formats.

Hierarchical structure 500 may be parsed in an iterative or recursive manner to determine features corresponding to the nodes of the hierarchy, for example text feature values associated with each node. In some embodiments, the hierarchical structure 500 is parsed according to a depth-first search configuration to determine text features corresponding to the nodes of the hierarchical structure 500. The hierarchical structure 500 may be generated, for example, by a structure generator such as HTML extraction subsystem 410 and may be parsed, for example, by a data generator, such as QA data generator 420.

Figure 5B:
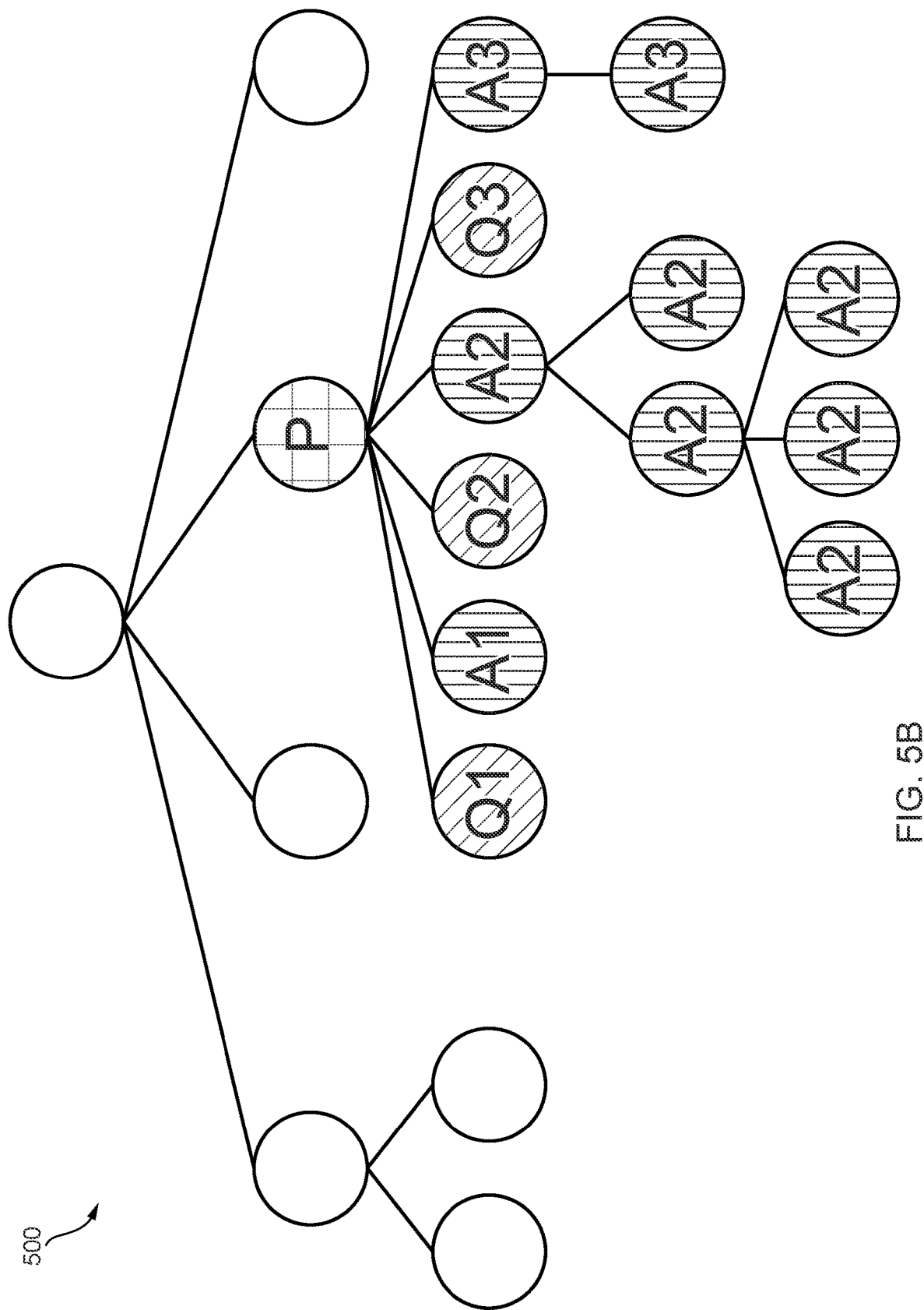
FIG. 5B illustrates an example document structure including a tree-based node hierarchy according to various embodiments.

FIG. 5B illustrates an example document structure including a tree-based node hierarchy according to various embodiments. Specifically, FIG. 5B depicts the hierarchical structure 500 after the hierarchy has be parsed to determine one or more aspects regarding the nodes. As depicted in FIG. 5B, some of the nodes have been shaded to distinguish them from other nodes. For example, a first node, highest on the hierarchy among the shaded nodes, is labelled with a "P," indicating it is a parent node of one or more child nodes.

In various embodiments, a subsystem parsing the nodal hierarchy compares text feature values corresponding to the nodes to known or likely text values to determine a type of the text feature values parsed. For example, a subsystem may parse the hierarchical structure 500 to determine any text features corresponding to a set of text known or likely to be a question. The subsystem may do so to extract relevant questions to be used to generate QA data as part of the embodiments described herein. In various embodiments, the nodes are processed to compare the corresponding text features of the node to a list of question-based terms or characters. For example, a parsing subsystem may determine that characters such as 'div', 'p', 'a', 'span', 'h1', 'h2', 'h3', 'h4', 'h5', 'h6', 'button', and others are tags of nodes generally associated with question text features. The subsystem may parse nodes to determine these or other tags using a regular expression. For example, the subsystem may parse the nodal hierarchy using the regular expression:

r'([^a-zA-Z]|^)(Is|Are|Am|Was|Were|Can|Could-|May|Might|Must|
Will||Would|Shall|Should|Do|Does|Did|
What||How|Why|When|Where|Which|Who|Whose)[^a-zA-Z][^!?]*\?'\

Once a node has been identified that likely corresponds to question text features, a parent node of the identified node is determined. The parent node may be, for example, an HTML-based element of the digital document that likely contains one or more question and answer pairs (e.g., a frequently asked questions section, or "FAQ"). Once the parent node has been determined, each child node of the parent is parsed to determine if the child nodes of the parent node also correspond to a question text feature, or may correspond to an answer text feature for a corresponding question. For example, as depicted in FIG. 5B, hierarchical structure 500 has been shaded to identify the parent node with a "P" designation. In various embodiments, the parent node may be determined in part by the tag of the parent node. For example, parent nodes are less likely to contain question or answer elements or tags with corresponding characters compared to the child nodes. Each of the child nodes has been parsed to determine if a corresponding text feature of the node represents a question or answer text feature. For example, a node corresponding to an answer feature may appear next to a node corresponding to a question feature when the nodal hierarchy is parsed in a depth-first search. Additionally, a parsing subsystem may compare tag terms known or likely to correspond to an answer text feature, such as 'div', 'p', 'a', 'span', 'h1', 'h2', 'h3', 'h4', 'h5', 'h6', 'ol', 'ul' ' ', 'table, img' if those, terms follow a question.

As depicted in FIG. 5B, question and answer pairs, "Q1" and "A1" have been determined as child nodes of parent node "P," as have question and answer pairs "Q2 and A2" and "Q3 and A3." A question text feature or an answer text feature may include multiple text segments representable by separate nodes. For example, as depicted in FIG. 5B, answers "A2" and "A3" are both compound answer statements, corresponding to more than one text feature extracted from the digital document.

Figure 6:
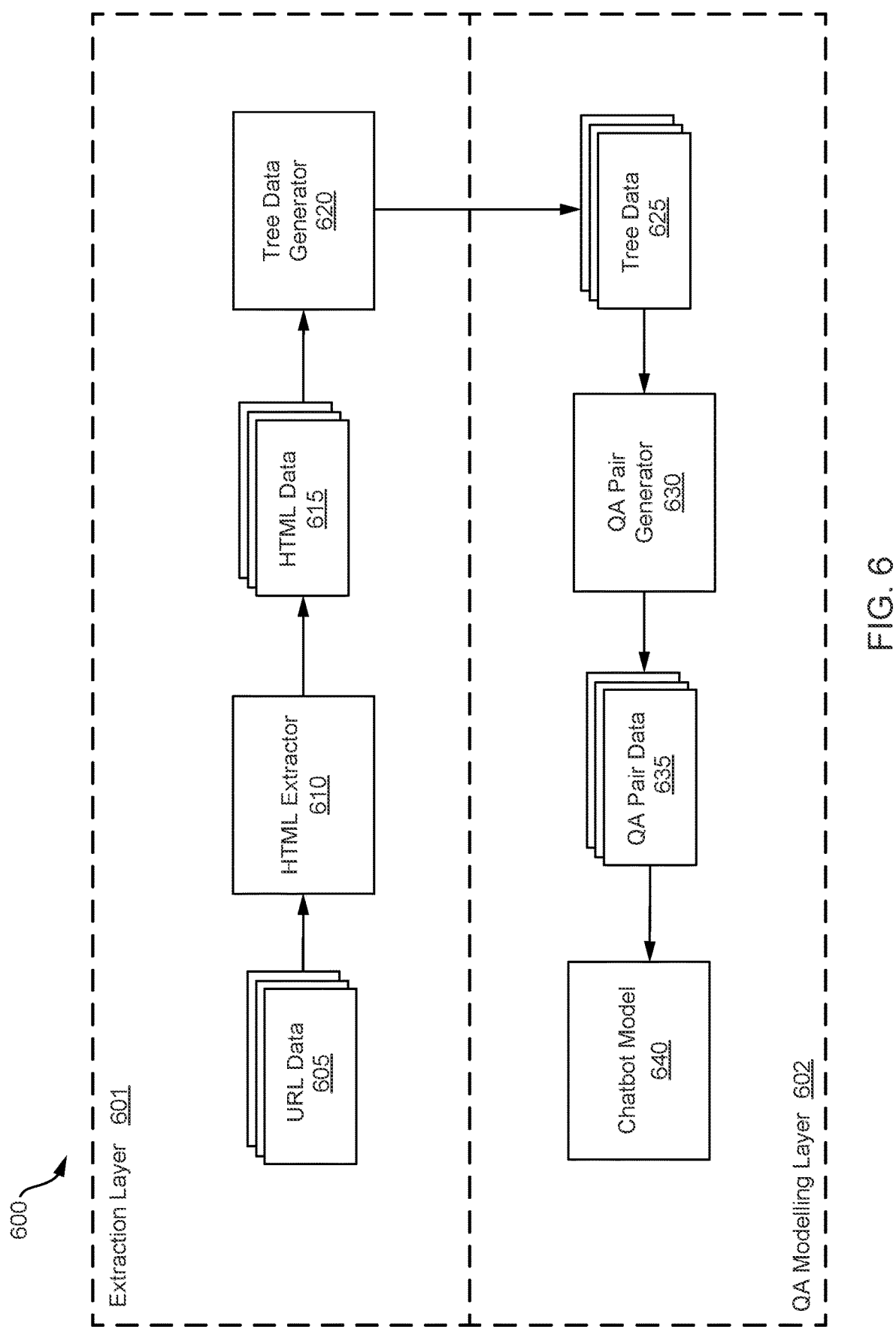
FIG. 6 is a simplified block diagram illustrating a flow for extracting question-and-answer data from URL data according to various embodiments.

FIG. 6 is a simplified block diagram illustrating a flow for extracting question-and-answer data from URL data according to various embodiments. The block diagram depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The flow of data and components presented in FIG. 6 and described below is intended to be illustrative and non-limiting. Although FIG. 6 depicts the various steps occurring in a particular sequence or order, this is not intended to be limiting. In certain alternative embodiments, the steps may be performed in some different order or some steps may also be performed in parallel.

As depicted in FIG. 6, system 600 is a system for extracting structural data from a digital document to generate QA data for training a machine learning chatbot model. System 600 may include an extraction layer 601 and an QA modelling layer 602. In various embodiments, system 600 is a data processing system such as data processing system 600 or a hardware/software based application for facilitating the embodiments described herein. For example extraction layer 601 may be implemented as part of HTML extraction subsystem 610 and QA modelling layer 602 may be implemented as part of QA data generator 620.

Extraction layer 601 of FIG. 6 may be a software/hardware domain configured to utilize some input digital address data to generate structural data as part of the embodiments described herein. For example, as depicted in FIG. 6, extraction layer may receive or otherwise access URL data 605. URL data may be a set of data including one or more addressed to one or more digital documents which will be utilized to generate QA data to train a chatbot model. In various embodiments, URL data 605 includes one or more URL addresses executable to allow a system to access a digital webpage using internet protocols. The URL data 605 may be sent to an HTML extractor 610 of extraction layer 601 to access the digital document and extract HTML data 615. For example, HTML extractor 610 may be configured to execute the one or more URLs in URL data 605 to access digital documents structured with HTML code. The HTML extractor may access the underlying HTML code of the digital document(s) to return some HTML data.

In various embodiments, the HTML extractor 610 or a similar subsystem may preprocess or post-process the HTML code of a digital document prior to extracting the HTML data 615. For example, the HTML extractor 610 may be configured to modify HTML code by removing null and control characters, HTML comments, illegal HTML code tags, whitespaces, newline characters, or other undesirable elements that would cause compatibility or efficiency issues with the processes described herein. The HTML extractor 610 may output this processed and extracted data as HTML data 615, representing the underlying HTML code of the digital document.

HTML data 615 may then be sent to a tree data generator 620. Tree data generator 620 may be a subsystem of the extraction layer 601 configured to transform input HTML data into structure data relating to a tree-based nodal hierarchy. For example, tree data generator 620 may be configured to parse the HTML data 615 to determine one or more hierarchical relationships between elements of the HTML data and generate a corresponding tree-based structure. Examples of a tree data generator include LXML, available at https://pypi.org/project/lxml/.

In various embodiments, tree data generator 620 is configured to parse HTML data 615 in order to generate data nodes in the tree model based on the code tags present in the HTML data 615. For example, tree data generator 620 may be configured to parse HTML data 615 based on tags recorded therein according to iterative or recursive methods to extract features associated with the tags. For example, a tag may include an indicator of a tag's position or relative importance within a digital document, and in some cases corresponds to a text feature (e.g., a text sentence represented in a natural language displayed on a webpage) of the tag. The resulting tree data generated by the tree data generator may be sent off of the extraction layer 601 and into the QA modelling layer 602.

QA modelling layer 602 may include one or more subsystems/models configured to utilize tree data to train a machine learning model, such as a chatbot model. Tree data 625 from tree data generator 620 may be sent to a QA pair generator 630. QA pair generator 630 may be a subsystem configured to parse a tree-based hierarchical model of a digital document to extract one or more QA pairs and generate QA pair data that may be used to train a machine learning model. For example, QA pair generator may be configured to parse a nodal hierarchy, such as the hierarchical structure 500 of FIGS. 5A and 5B, to extract question and answer pairs.

QA pair generator 630 may, for example, parse the tree data 625 in a depth-first search manner to determine one or more question nodes based on a corresponding tag data for the nodes and a list of possible question tags known to the generator. After one or more question nodes have been identified, QA pair generator 630 may determine parent nodes of the one or more question nodes identified and one or more sibling nodes of the one or more question nodes based on the parent nodes. The sibling nodes may correspond to other questions or answer nodes sharing a similar parent node to the identified one or more question nodes. The QA pair generator 630 may be further configured to associated a subset of the identified question nodes with a subset of the answer nodes to form mappings of question and answers for multiple elements of the digital document.

In various embodiments, the QA pair generator comprises an encoder model configured to encode the question and answer pair into embedded QA data that may be accepted as training data by a chatbot model. For example, the generated QA pairings may be input to an encoder model that will alter the underlying data of the QA pairs to conform to a parameterized format acceptable to a neural network associated with a chatbot. The encoded data may be output as QA pair data 635 from QA pair generator.

The QA pair data 635 may then be input to a chatbot model 640. In various embodiments, chatbot model 640 may be configured to receive QA pair data 635 to cause training of the chatbot model to better recognize and response to QA pair data. For example, a chatbot model may utilize any supervised or unsupervised learning techniques to retrain parameterized relationships in the existing chatbot model or to associate a particular answer with a particular question or a similar form of that question.

In an example embodiment, a client utilizing a chatbot model sends a URL of a website including FAQs to a data processing system to train the chatbot model to answer the questions in the FAQ. The data processing system may first execute the URL to access the webpage and the underlying HTML code of the FAQ. The extracted HTML code may be processed to remove unnecessary elements for generating QA data and send the HTML code to a tree data generator. The tree data generator will model the relationships and hierarchies present in the HTML code as a tree-based nodal hierarchy sorted by tags of the HTML code. The result is tree data that is in a form that may be parsed to generate QA pair data. The tree data may be sent to a QA pair generator to extract QA pairs. For example, the QA pair generator may parse the tree data to determine one or more questions present in the FAQ based on semantic indicators in the tags of the FAQ HTML code or the text of the FAQ webpage itself. The QA pair generator may then continue to parse the tree data relative to the identified questions to determine answers for the questions posed in the FAQ. As the QA pair generator identifies answers for a particular question, it may store the question and answer as mapped data corresponding to a relationship between the question and answer as presented in the FAQ. The resulting QA data may be sent to a chatbot model to train the chatbot model to better respond to questions from the FAQ. For example, the chatbot model may learn to recognize elements of a particular question and alter parameters of the chatbot model to provide a corresponding answer to the predicted particular question.

Example Rules-Based Extraction Processes

Figure 7:
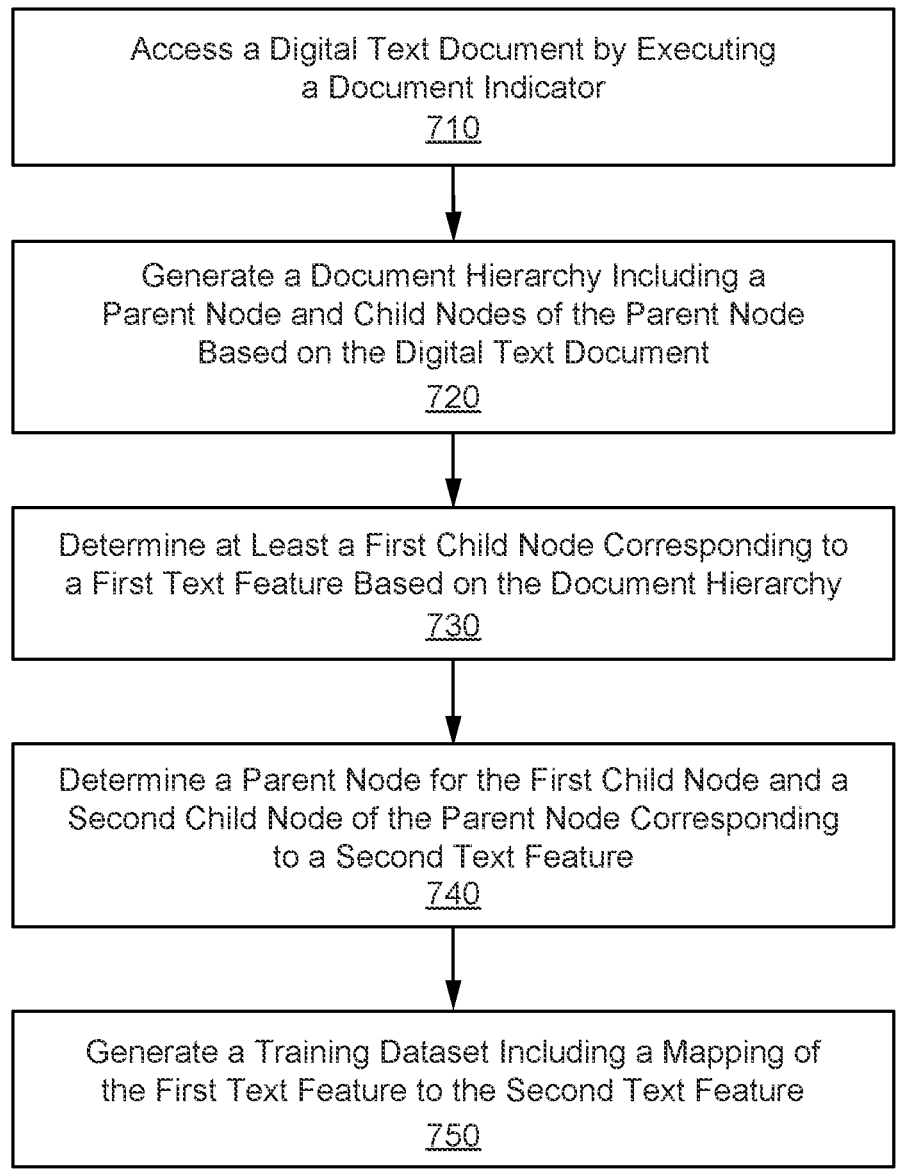
FIG. 7 illustrates a process flow for generating question-and-answer data from URL data according to various embodiments.

FIG. 7 illustrates a process flow for generating question-and-answer data from URL data according to various embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel.

At 710, a digital text document is accessed by executing a document indicator. A data processing system may receive a digital document address executable to generate or receive the digital document. For example, a data processing system may execute a URL to access a webpage including a HTML structure. The URL may be executed on an internet browser, web crawler, or other access protocol to gain access to the underlying HTML code for building the webpage. In some embodiments, accessing the digital text document may comprise retrieving the HTML code used to generated the digital document without generating a graphical web page. The HTML code may be preprocessed or post-processed to modify the HTML code prior to constructing a document hierarchy from the HTML code.

At 720, a document hierarchy including a parent node and child nodes of the parent node is generated based on the digital text document accessed in 710. The data processing system may generate the digital hierarchy based on HTML data extracted from the digital text document. For example, the data processing system may parse the HTML data extracted from the digital text document to determine a document structure. The document structure may indicate a hierarchy of tags or elements in the digital text document that may be used to derived a tree-based model. The tags or elements may be a represented by nodes in the tree-based model and the dependencies between elements may be represented by edges between the nodes.

At 730, at least a first child node corresponding to a first text feature is determined based on the document hierarchy generated in 720. The data processing system may determine the first child note and the first text feature by parsing the tree-model generated in 720 in an iterative or recursive manner for terms corresponding the question text. For example, the data processing system may parse nodes of the tree-based model to identify the text features of each node. The text feature of the nodes may be compared to a list of character sequences indicating that the corresponding portion of the digital text document relates to a question of a question and answer pair.

At 740, a parent node for the first child node and a second child node of the first parent node are determined. The data processing system may use the identified first child node to determine the parent node. For example, a parent node of a first child node that corresponding to a question of a question and answer pair may be likely to relate to other questions of question and answer pairs due to the nature of the digital text document hierarchy of elements. Based on the parent node, one or more additional child nodes may be identified, including a second child node that likely corresponds to an answer to the question identified in 730. This may be determined by parsing the tags of the one or more child nodes to compare the tags, or another element of the node as a second text feature, to a list of likely answer character sets.

At 750, a training dataset including a mapping of the first text features to the second text feature is generated. The data processing system may group the first text feature and the second text feature together as a mapped set of data corresponding to a question and answer pair extracted from the digital text document. The resulting training dataset may be utilized to train a machine learning model such as a chatbot by generating an objective function based on the training dataset and one or more aspects of the machine learning model. The objective function may be utilized to alter one or more weighted relationships in the machine learning model to train the machine learning model to response to the question.

Illustrative Systems

Figure 8:
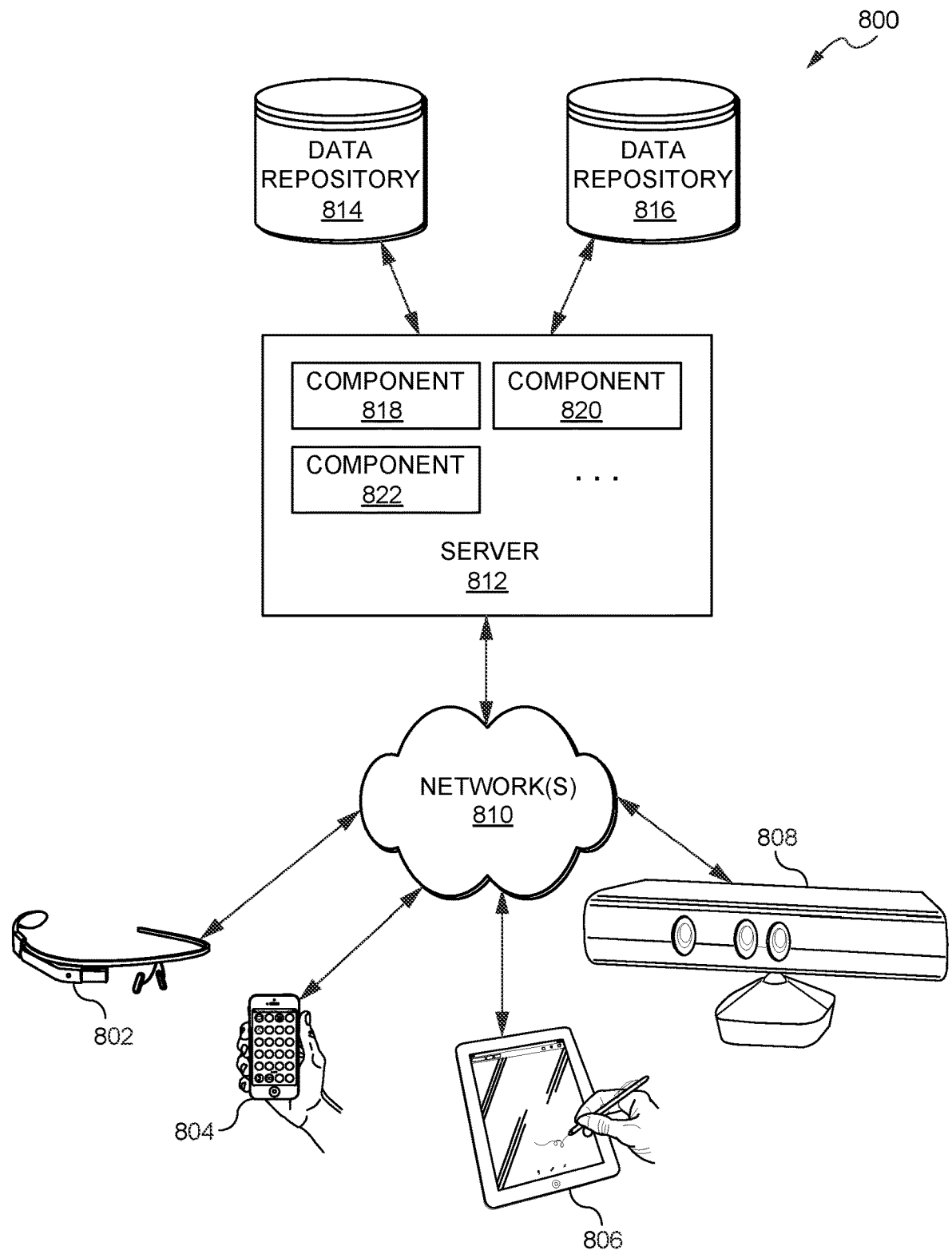
FIG. 8 depicts a simplified diagram of a distributed system for implementing various embodiments.

FIG. 8 depicts a simplified diagram of a distributed system 800. In the illustrated example, distributed system 800 includes one or more client computing devices 802, 804, 806, and 808, coupled to a server 812 via one or more communication networks 810. Clients computing devices 802, 804, 806, and 808 may be configured to execute one or more applications.

In various examples, server 812 may be adapted to run one or more services or software applications that enable one or more embodiments described in this disclosure. In certain examples, server 812 may also provide other services or software applications that may include non-virtual and virtual environments. In some examples, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The example shown in FIG. 8 is thus one example of a distributed system for implementing an example system and is not intended to be limiting.

Users may use client computing devices 802, 804, 806, and/or 808 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 8 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an) iPhone®, tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 810 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 may include one or more virtual machines running virtual operating systems, or other computing architectures involving virtualization such as one or more flexible pools of logical storage devices that may be virtualized to maintain virtual storage devices for the server. In various examples, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information in certain examples. For example, one or more of the data repositories 814, 816 may be used to store information such as information related to chatbot performance or generated models for use by chatbots used by server 812 when performing various functions in accordance with various embodiments. Data repositories 814, 816 may reside in a variety of locations. For example, a data repository used by server 812 may be local to server 812 or may be remote from server 812 and in communication with server 812 via a network-based or dedicated connection. Data repositories 814, 816 may be of different types. In certain examples, a data repository used by server 812 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 814, 816 may also be used by applications to store application data. The data repositories used by applications may be of different types such as, for example, a key-value store repository, an object store repository, or a general storage repository supported by a file system.

Figure 9:
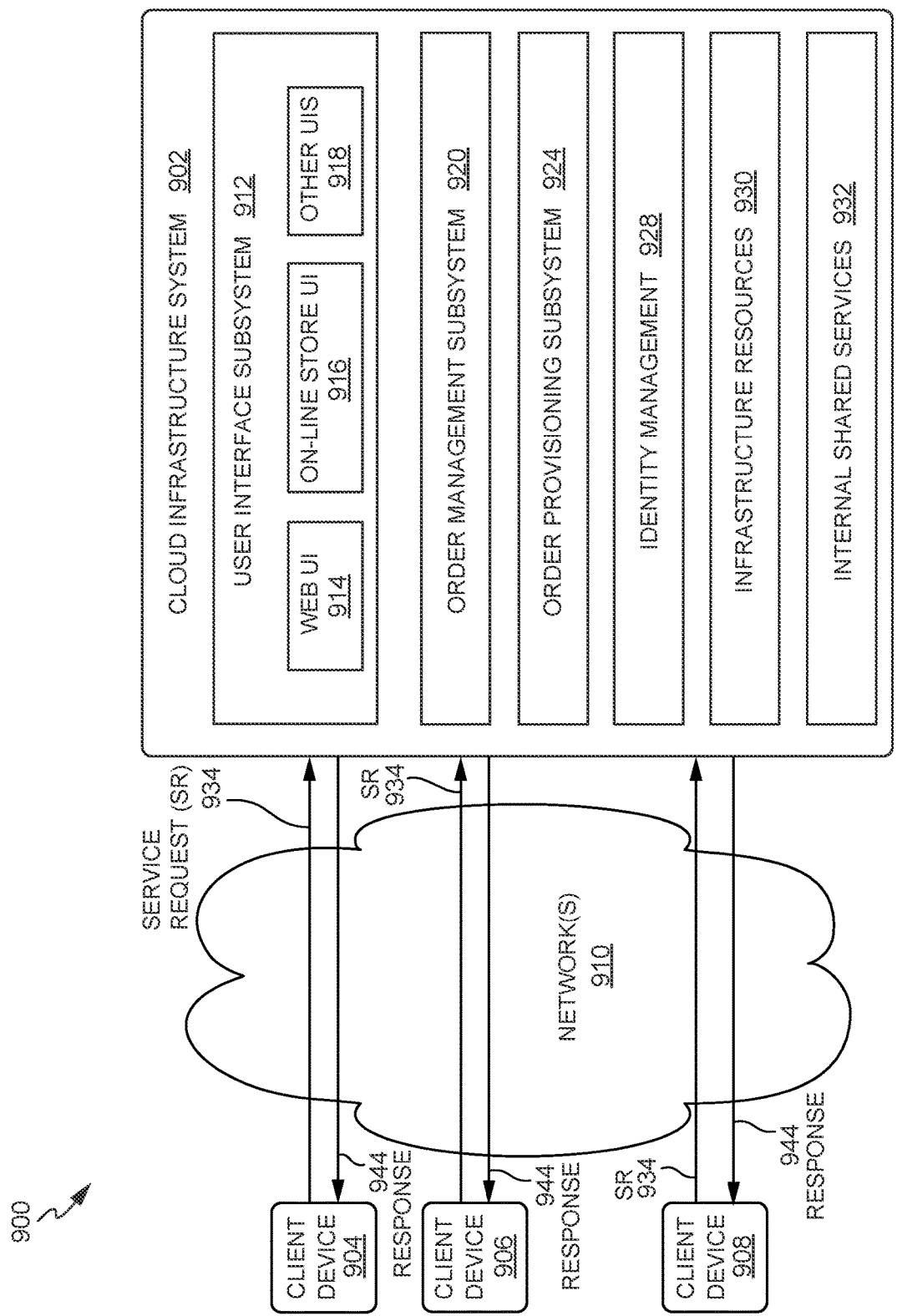
FIG. 9 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 9 is a simplified block diagram of a cloud-based system environment in which various services may be offered as cloud services in accordance with certain examples. In the example depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 912. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The example depicted in FIG. 9 is only one example of a cloud infrastructure system and is not intended to be limiting. It should be appreciated that, in some other examples, cloud infrastructure system 902 may have more or fewer components than those depicted in FIG. 9, may combine two or more components, or may have a different configuration or arrangement of components. For example, although FIG.

9 depicts three client computing devices, any number of client computing devices may be supported in alternative examples.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer may be an individual or an enterprise. In certain other examples, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 902 and the services provided may be shared by several organizations in a related community. Various other models such as hybrids of the above mentioned models may also be used.

Client computing devices 904, 906, and 908 may be of different types (such as client computing devices 802, 804, 806, and 808 depicted in FIG. 8) and may be capable of operating one or more client applications. A user may use a client device to interact with cloud infrastructure system 902, such as to request a service provided by cloud infrastructure system 902. For example, a user may use a client device to request information or action from a chatbot as described in this disclosure.

In some examples, the processing performed by cloud infrastructure system 902 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 902 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like. In certain examples, the storage virtual machines that are available for servicing storage requested from applications may be part of cloud infrastructure system 902. In other examples, the storage virtual machines may be part of different systems.

In certain examples, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to. For example, a customer may place a subscription order for a service offered by cloud infrastructure system 902. As part of the order, the customer may provide information identifying a chatbot system for which the service is to be provided and optionally one or more credentials for the chatbot system.

In certain examples, such as the example depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 902 as part of the provisioning process. Cloud infrastructure system 902 may generate an application ID and select a storage virtual machine for an application from among storage virtual machines provided by cloud infrastructure system 902 itself or from storage virtual machines provided by other systems other than cloud infrastructure system 902.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 902 and information identifying a chatbot system selected by cloud infrastructure system 902 for the chatbot system corresponding to the chatbot system ID.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain examples, cloud infrastructure system 902 comprises an identity management subsystem (IMS) 928 that is configured to manage customer information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
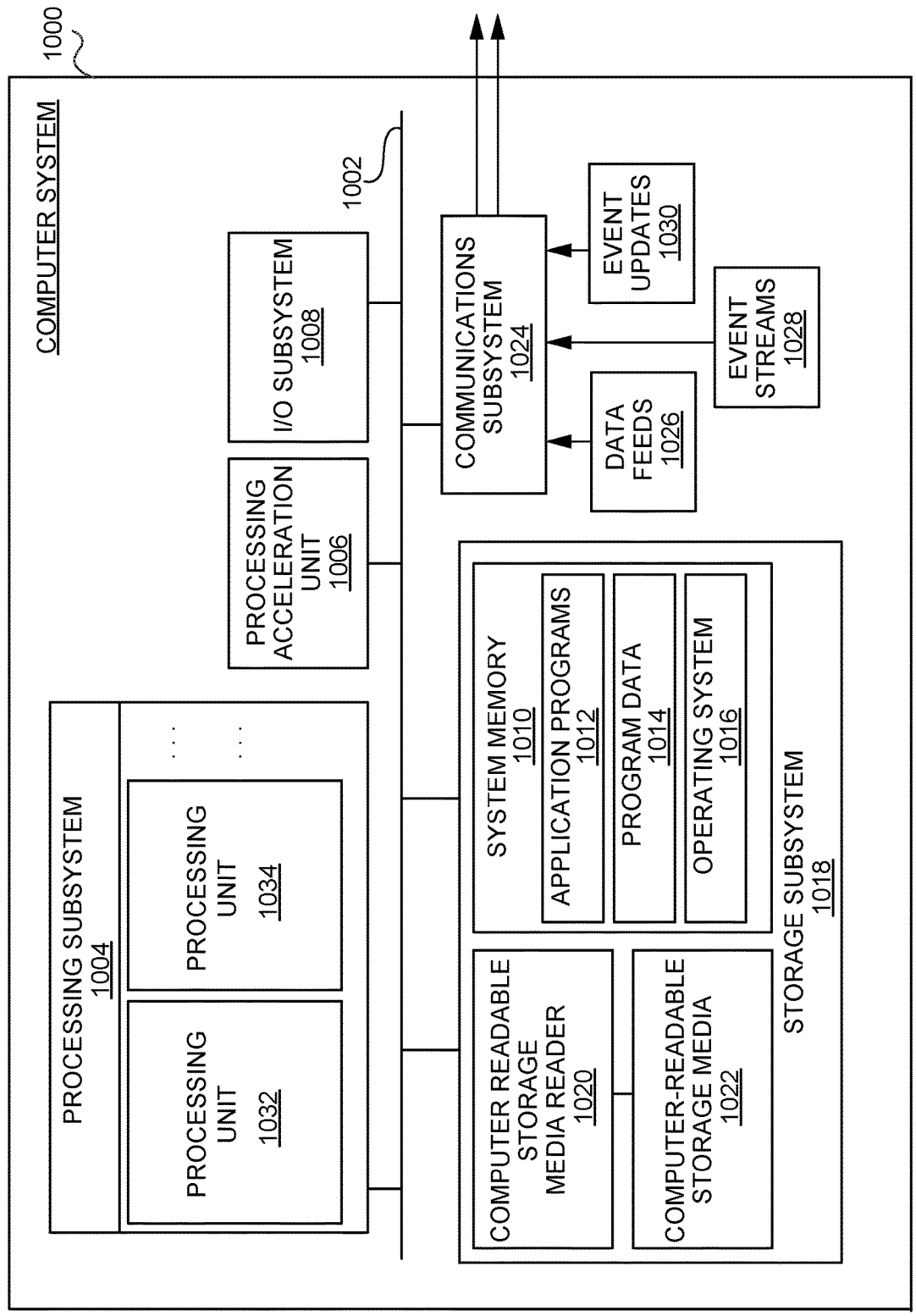
FIG. 10 illustrates an example computer system that may be used to implement various embodiments.

FIG. 10 illustrates an example of computer system 1000. In some examples, computer system 1000 may be used to implement any of the digital assistant or chatbot systems within a distributed environment, and various servers and computer systems described above. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative examples of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 may be organized into one or more processing units 1032, 1034, etc. A processing unit may include one or more processors, one or more cores from the same or different processors, a combination of cores and processors, or other combinations of cores and processors. In some examples, processing subsystem 1004 may include one or more special purpose co-processors such as graphics processors, digital signal processors (DSPs), or the like. In some examples, some or all of the processing units of processing subsystem 1004 may be implemented using customized circuits, such as application specific integrated circuits (ASICs), or field programmable gate arrays (FPGAs).

In some examples, the processing units in processing subsystem 1004 may execute instructions stored in system memory 1010 or on computer readable storage media 1022. In various examples, the processing units may execute a variety of programs or code instructions and may maintain multiple concurrently executing programs or processes. At any given time, some or all of the program code to be executed may be resident in system memory 1010 and/or on computer-readable storage media 1022 including potentially on one or more storage devices. Through suitable programming, processing subsystem 1004 may provide various functionalities described above. In instances where computer system 1000 is executing one or more virtual machines, one or more processing units may be allocated to each virtual machine.

In certain examples, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some examples. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide authentication in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some examples. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1018 may also include a computer-readable storage media reader 1020 that may further be connected to computer-readable storage media 1022. Reader 1020 may receive and be configured to read data from a memory device such as a disk, a flash drive, etc.

In certain examples, computer system 1000 may support virtualization technologies, including but not limited to virtualization of processing and memory resources. For example, computer system 1000 may provide support for executing one or more virtual machines. In certain examples, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, when computer system 1000 is used to implement bot system 120 depicted in FIG. 1, the communication subsystem may be used to communicate with a chatbot system selected for an application.

Communication subsystem 1024 may support both wired and/or wireless communication protocols. In certain examples, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1024 may provide wired network connectivity (e.g., Ethernet) in addition to or instead of a wireless interface.

Communication subsystem 1024 may receive and transmit data in various forms. In some examples, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method, comprising:
storing, in a repository of a data processing system, a machine learning model;
accessing, by the data processing system, a digital text document by executing a document indicator;
generating, by the data processing system based on the digital text document, a document hierarchy comprising a plurality of parent nodes and a plurality of child nodes, each node of the plurality of child nodes corresponding to a text feature among a plurality of text features of the digital text document, the plurality of text features comprising pairs of related text features, each pair comprising a question and an answer corresponding to the question of the pair;
determining, by the data processing system based on the document hierarchy, a first child node of the plurality of child nodes, the first child node corresponding to a first text feature among the plurality of text features, the first text feature representing a question;

determining, by the data processing system based on the first child node, a parent node of the first child node among the plurality of parent nodes;

determining, by the data processing system, a second child node of the parent node, as a child node of the parent node that corresponds to a second text feature among the plurality of text features, the second text feature being an answer corresponding to the question represented by the first text feature;

generating, by the data processing system, a training data set, the training data set comprising a mapping between the first text feature and the second text feature;

training, by the data processing system, the machine learning model using the training data set, to train one or more relationships existing between the first text feature and the second text feature, the training comprising inputting the training data set to the machine learning model to generate an objective value, wherein training the one or more relationships in the machine learning model comprises modifying one or more weight values of the machine learning model based on the generated objective value, and generating an updated machine learning model configured for a question and answer intent, wherein the updated machine learning model is configured to, based on an utterance provided as an input by a user, identify an intent as the question and answer intent for the utterance, from a set of predetermined intents, and output a prediction of an answer for the utterance.

2. The method of claim 1, wherein the document indicator is a uniform resource location (URL) address.

3. The method of claim 2, wherein executing the document indicator comprises executing the URL address to access the digital text document in a network domain.

4. The method of claim 1, wherein the digital text document is a web-based document comprising one or more HyperText Markup Language (HTML) expressions, the one or more HTML expressions structured in the digital text document according to the document hierarchy.

5. The method of claim 4, further comprising:
extracting, in response to accessing the digital text document, the one or more HTML expressions; and
modifying the one or more HTML expressions to generate compressed HTML data, the compressed HTML data corresponding to a subset of the HTML data not comprising auxiliary text characters, wherein the document hierarchy is generated based on the compressed HTML data.

6. The method of claim 1, wherein the document hierarchy is a tree diagram, the parent node is a branch node of the tree diagram, and the first child node and the second child node are leaf nodes of the branch node.

7. The method of claim 1, wherein determining the first child node comprises evaluating one or more nodes of the document hierarchy using a feature list, the feature list comprising one or more expressions relating to the first text feature.

8. The method of claim 1, wherein, in the determining the parent node and the second child node, one or more nodes of the document hierarchy are evaluated using a feature list, the feature list comprising one or more expressions relating to the parent node and the second text feature.

9. The method of claim 1, wherein, in the determining the first child node, the parent node, and the second child node, nodes of the document hierarchy are traversed using a depth-first-search.

10. A system comprising:
a repository configured to store a machine learning model;
a training subsystem configured to train the machine learning model;
one or more processors; and
a non-transitory computer-readable medium coupled to the one or more processors, the non-transitory computer-readable medium storing instructions that when executed executable by the one or more processors, to-cause the one or more processors to perform operations including:

accessing a digital text document by executing a document indicator;

generating, based on the digital text document, a document hierarchy comprising a plurality of parent nodes and a plurality of child nodes, each node of the plurality of child nodes corresponding to a text feature among a plurality of text features of the digital text document, the plurality of text features comprising pairs of related text features, each pair comprising a question and an answer corresponding to the question of the pair;

determining, based on the document hierarchy, a first child node of the plurality of child nodes, the first child node corresponding to a first text feature among the plurality of text features, the first text feature representing a question;

determining, based on the first child node, a parent node of the first child node among the plurality of parent nodes;

determining a second child node of the parent node, as a child node of the parent node that corresponds to a second text feature among the plurality of text features, the second text feature being an answer corresponding to the question represented by the first text feature;

generating a training data set, the training data set comprising a mapping between the first text feature and the second text feature;

training, by the training subsystem using the training data set, the machine learning model to train one or more relationships existing between the first text feature and the second text feature, the training including inputting the training data set to the machine learning model to generate an objective value, wherein training the one or more relationships in the machine learning model includes modifying one or more weight values of the machine learning model based on the generated objective value; and generating an updated machine learning model configured for a question and answer intent, wherein the updated machine learning model is configured to, based on an utterance provided as an input by a user, identify an intent as the question and answer intent for the utterance, from a set of predetermined intents, and output a prediction of an answer for the utterance.

11. The system of claim 10, wherein the document indicator is a uniform resource location (URL) address, and
wherein the accessing the document indicator includes executing the URL address to access the digital text document in a network domain.

12. The system of claim 10, wherein the digital text document is a web-based document comprising one or more Hyper Text Markup Language (HTML) expressions, the one or more HTML expressions structured in the digital text document according to the document hierarchy, and wherein the operations further include:

extracting, in response to accessing the digital text document, the one or more HTML expressions; and modifying the one or more HTML expressions to generate compressed HTML data, the compressed HTML data corresponding to a subset of the HTML data not comprising auxiliary text characters, wherein the document hierarchy is generated based on the compressed HTML data.

13. The system of claim 10, wherein the determining the first child node includes evaluating one or more nodes of the document hierarchy using a feature list, the feature list comprising one or more expressions relating to the first text feature.

14. The system of claim 10, wherein, in the determining the parent node and the second child node, one or more nodes of the document hierarchy are evaluated using a feature list, the feature list comprising one or more expressions relating to the parent node and the second text feature.

15. A non-transitory computer-readable medium storing instructions that, when executed by one or more processors, cause the one or more processors to perform operations including:

storing, in a repository of a data processing system, a machine learning model;

accessing a digital text document by executing a document indicator;

generating, based on the digital text document, a document hierarchy comprising a plurality of parent nodes and a plurality of child nodes, each node of the plurality of child nodes corresponding to a text feature among a plurality of text features of the digital text document, the plurality of text features comprising pairs of related text features, each pair comprising a question and an answer corresponding to the question of the pair;

determining, based on the document hierarchy, a first child node of the plurality of child nodes, the first child node corresponding to a first text feature among the plurality of text features, the first text feature representing a question;

determining, based on the first child node, a parent node of the first child node among the plurality of parent nodes;

determining a second child node of the parent node, as a child node of the parent node that corresponds to a second text feature among the plurality of text features, the second text feature being an answer corresponding to the question represented by the first text feature;

generating a training data set, the training data set comprising a mapping between the first text feature and the second text feature;

training the machine learning model using the training data set, to train one or more relationships existing between the first text feature and the second text feature, the training including inputting the training data set to the machine learning model to generate an objective value, wherein training the one or more relationships in the machine learning model includes modifying one or more weight values of the machine learning model based on the generated objective value; and generating an updated machine learning model configured for a question and answer intent, wherein the updated machine learning model is configured to, based on an utterance provided as an input by a user identify an intent as the question and answer intent for the utterance, from a set of predetermined intents, and output a prediction of an answer for the utterance.

16. The non-transitory computer-readable medium of claim 15, wherein the digital text document is a web-based document comprising one or more HyperText Markup Language (HTML) expressions, the one or more HTML expressions structured in the digital text document according to the document hierarchy, and wherein the operations further include:

extracting, in response to accessing the digital text document, the one or more HTML expressions; and modifying the one or more HTML expressions to generate compressed HTML data, the compressed HTML data corresponding to a subset of the HTML data not comprising auxiliary text characters, wherein the document hierarchy is generated based on the compressed HTML data.

17. The non-transitory computer-readable medium of claim 15, wherein, in the determining the parent node and the second child node, one or more nodes of the document hierarchy are evaluated using a feature list, the feature list comprising one or more expressions relating to the parent node and the second text feature.

* * * * *